United States Patent
Lee et al.

(10) Patent No.: US 8,259,439 B2
(45) Date of Patent: Sep. 4, 2012

(54) COMPUTER MOUSE

(75) Inventors: Tsung-shih Lee, Tu Cheng (TW); Yu-hsiang Ting, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 160 days.

(21) Appl. No.: 12/916,584

(22) Filed: Oct. 31, 2010

(65) Prior Publication Data

US 2012/0106057 A1    May 3, 2012

(51) Int. Cl.
*G06F 1/16* (2006.01)
(52) U.S. Cl. ............... 361/679.02; 361/679.01; 345/163
(58) Field of Classification Search ............. 361/679.02; 345/163
See application file for complete search history.

(56) References Cited

U.S. PATENT DOCUMENTS

| | | | |
|---|---|---|---|
| 6,225,981 B1 * | 5/2001 | Lu | 345/164 |
| 7,016,185 B2 * | 3/2006 | Chen et al. | 361/679.4 |
| 7,924,266 B2 * | 4/2011 | Larsen | 345/163 |
| 8,081,160 B2 * | 12/2011 | Cheng et al. | 345/163 |
| 2008/0218478 A1 * | 9/2008 | Cheng et al. | 345/163 |
| 2012/0106056 A1 * | 5/2012 | Lee et al. | 361/679.4 |

* cited by examiner

*Primary Examiner* — Anthony Q Edwards
(74) *Attorney, Agent, or Firm* — Cheng-Ju Chiang

(57) ABSTRACT

A computer mouse is provided and has a mouse main body, a rubber cover and a foot pad. The mouse main body has engagement holes. The rubber cover is covered on the mouse main body and formed with an opening. The foot pad has a flat foot-pad main body which has engagement members, each of which has a connection portion. The connection portion has a first end connected to the engagement member and having a height matched with that of the engagement hole, and a second end protruded to form an umbrella-like engagement portion. When installing the computer mouse, the connection portion passes through the opening and is then received in the engagement hole, and the engagement portion is engaged against an inner edge of the engagement hole, so that the foot pad is firmly mounted on the computer mouse. Thus, the computer mouse has simpler installation and aesthetic appearance.

2 Claims, 3 Drawing Sheets

COMPUTER MOUSE

FIELD OF THE INVENTION

The present invention relates to a computer mouse, and more particularly to a bendable computer mouse.

BACKGROUND OF THE INVENTION

Traditionally, when a computer mouse is used to move on an object (such as a desk top, a mouse pad and etc.), the friction is inevitably and continuously generated between the computer mouse and the object. For increasing the abrasion resistance of a traditional computer mouse, at least one foot pad is generally attached to a bottom end surface of the computer mouse by adhesive or screw-connected thereto by screws.

However, the foot pad of the traditional computer mouse is installed by adhesive or screws, so that the installation is relatively complicated and has no aesthetic appearance.

SUMMARY OF THE INVENTION

A primary object of the present invention is to provide a computer mouse, which has simpler installation and aesthetic appearance and thus can overcome the disadvantages existing in the conventional technologies, as described above.

To achieve the above object, a computer mouse of the present invention comprises a mouse main body, a rubber cover and a foot pad. One end of the computer mouse is provided and has a mouse main body, a rubber cover and a foot pad. The mouse main body has one end formed with at least one engagement hole. The rubber cover is covered on an outer side of the mouse main body and has one end formed with at least one opening. The foot pad has a flat foot-pad main body which has one end formed with at least one engagement member. The engagement member has a connection portion. The connection portion has a first end connected to the engagement member and having a height matched with that of the engagement hole, and a second end protruded toward two lateral sides to form an umbrella-like engagement portion. The connection portion of the engagement member can pass through the opening of the rubber cover and then be received in the engagement hole. Meanwhile, the engagement portion is engaged against an inner edge of the engagement hole.

As described above, when installing the computer mouse, the connection portion of the engagement member of the foot pad passes through the opening of the rubber cover and then received in the engagement hole. The first end of the connection portion connected to the engagement member has the height matched with that of the engagement hole, so as to ensure to install the foot pad on the computer mouse without shifting upward or downward. The umbrella-like engagement portion of the engagement member is engaged against the inner edge of the engagement hole. Thus, the foot pad is firmly mounted on an outer side of the computer mouse, so that the computer mouse has simpler installation and aesthetic appearance.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

Figure 1:
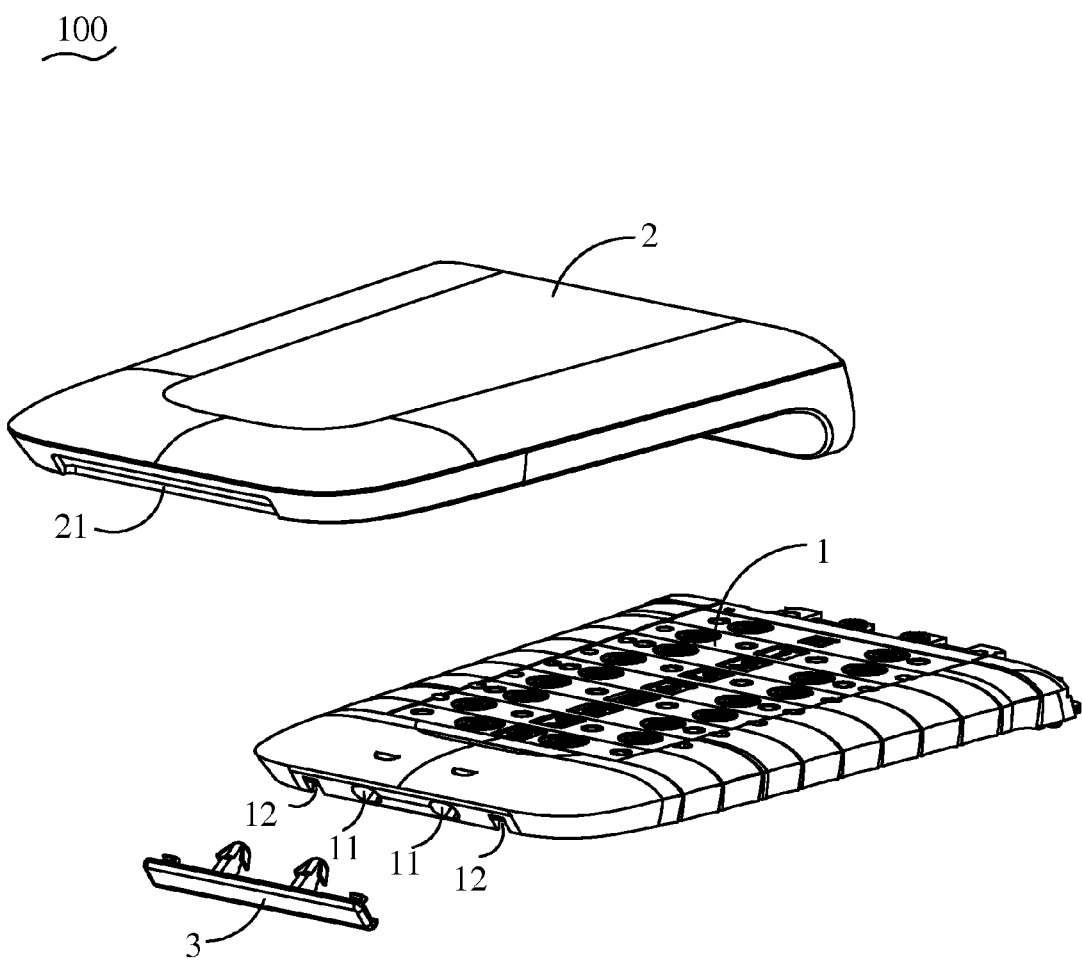
FIG. 1 is an exploded perspective view of a computer mouse according to a preferred embodiment of the present invention.

Referring now to FIG. 1, a computer mouse 100 according to a preferred embodiment of the present invention is illustrated. As shown, the computer mouse 100 has a specific L-shape curved profile, and comprises a mouse main body 1, a rubber cover 2 and a foot pad 3.

Referring still to FIG. 1, a front end of the mouse main body 1 has a central portion formed with two engagement holes 11, and each of two outer sides of the two engagement holes 11 is formed with a retaining recess 12.

The rubber cover 2 has a profile matched with that of the mouse main body 1. An upper front end of the rubber cover 2 is formed with an opening 21.

Figure 2:
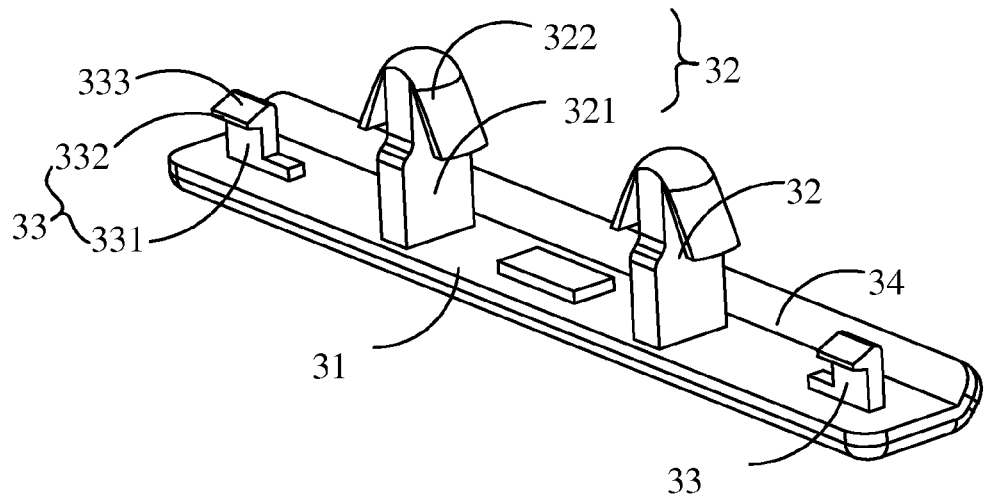
FIG. 2 is a perspective view of a foot pad as shown in FIG. 1 from another viewing angle.
Figure 3:
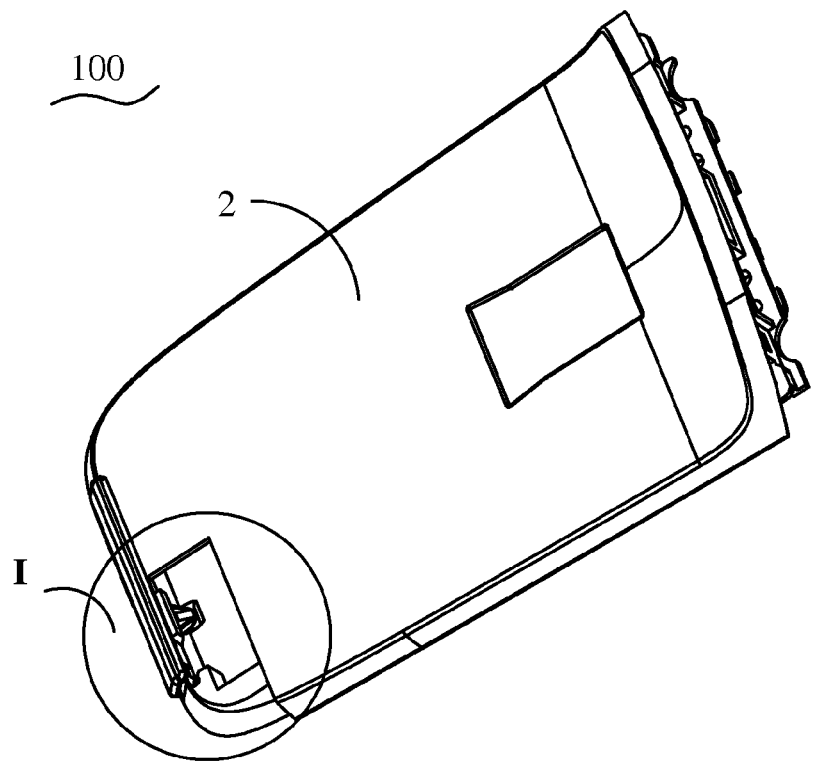
FIG. 3 is a partially cross-sectional view of the computer mouse according to the preferred embodiment of the present invention.
Figure 4:
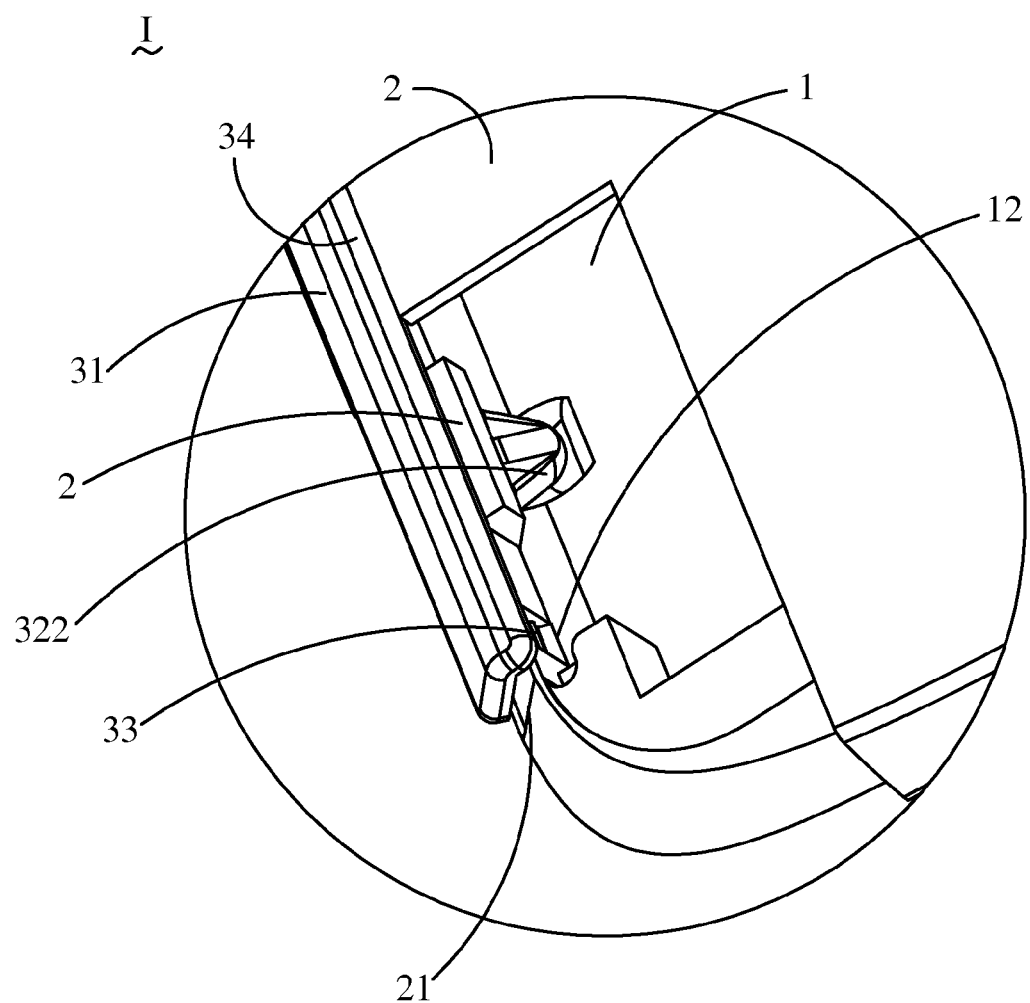
FIG. 4 is a partially enlarged view of a portion "I" as shown in FIG. 3.

Referring now to FIG. 2, the foot pad 3 has a flat foot-pad main body 31, wherein a rear surface of the foot-pad main body 31 has a central portion formed with two engagement members 32, each of which has a connection portion 321. The connection portion 321 has a first end connected to the engagement member 32 and the first end has a height matched with a height of the engagement hole 11, so as to ensure to install the foot pad 3 on the computer mouse 100 without shifting upward or downward. In addition, a second end of the connection portion 321 is protruded toward two lateral sides to form an engagement portion 322. The engagement portion 322 has an umbrella-like structure for being firmly engaged against an inner edge of the engagement hole 11. The rear surface of the foot-pad main body 31 has two lateral sides adjacent to the two engagement members 32, wherein each of the two lateral sides is formed with a retaining member 33. The retaining member 33 has an elastic arm 331 connected to the foot-pad main body 31 and an engagement fastener 332 protruded from a distal end of the elastic arm 331 toward an upper side of the foot-pad main body 31. The width of the elastic arm 331 of the retaining member 33 is matched with the width of the retaining recess 12, in order to ensure to install the foot pad 3 without shifting leftward or rightward. The engagement fastener 332 is formed with an inclined guiding surface 333. The foot-pad main body 31 has a lower side edge extended backward to form an inclined holding portion 34.

Referring now to FIGS. 1, 2, 3 and 4, when installing the computer mouse 100 of the present invention, the rubber cover 2 is covered on an outer side of the mouse main body 1 for increasing the aesthetic effect and the operational comfortableness of the computer mouse 100. The foot-pad main body 31 of the foot pad 3 is received in the opening 21 of the rubber cover 2. The holding portion 34 of the foot pad 3 can engage against an outer side wall of the mouse main body 1. Each of the retaining members 33 is engaged in one of the retaining recesses 12. The inclined guiding surfaces 333 guide the engagement fasteners 332 of the engagement members 33 to engage against an inner edge of the retaining recesses 12. The connection portions 321 of the engagement members 32 pass through the opening 21 of the rubber cover 2, and than engaged and received in the engagement holes 11. Meanwhile, the engagement fasteners 322 engage against an inner edge of the engagement holes 11.

As described above, when installing the computer mouse 100, the connection portions 321 of the engagement members 32 of the foot pad 3 passes through the opening 21 of the rubber cover 2 and then received in the engagement holes 11 of the mouse main body 1. The first end of the connection portions 321 connected to the engagement members 32 has the height matched with that of the engagement holes 11, so as to ensure to install the foot pad 3 on the computer mouse 100 without shifting upward or downward. The umbrella-like engagement portions 322 of the engagement members 32 are engaged against the inner edge of the engagement holes 11. Thus, the foot pad 3 is firmly mounted on an outer side of the computer mouse 100, so that the computer mouse 100 has simpler installation and aesthetic appearance.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A computer mouse, comprising:
   a mouse main body having one end formed with at least one engagement hole;
   a rubber cover covered on an outer side of the mouse main body and having one end formed with at least one opening; and
   a foot pad having a flat foot-pad main body which has one end formed with at least one engagement member; the engagement member having a connection portion; wherein the connection portion has a first end connected to the engagement member and having a height matched with that of the engagement hole and a second end protruded toward two lateral sides to form an umbrella-like engagement portion; wherein the connection portion of the engagement member passes through the opening of the rubber cover and is then received in the engagement hole; and wherein the engagement portion is engaged against an inner edge of the engagement hole.

2. The computer mouse according to claim 1, wherein the foot-pad main body is further formed with two retaining members, each of which has an elastic arm and an engagement fastener protruded from a distal end of the elastic arm toward a side of the foot-pad main body, wherein the engagement fastener is formed with an inclined guiding surface, and the foot-pad main body has a side edge extended to form an inclined holding portion which engages against an outer side wall of the mouse main body; the mouse main body is further formed with two retaining recesses; the width of the elastic arm of the retaining member is matched with the width of the retaining recess; each of the retaining members is engaged in one of the retaining recesses; and each of the engagement fasteners of the engagement members engages against an inner edge of the retaining recesses.

* * * * *